---

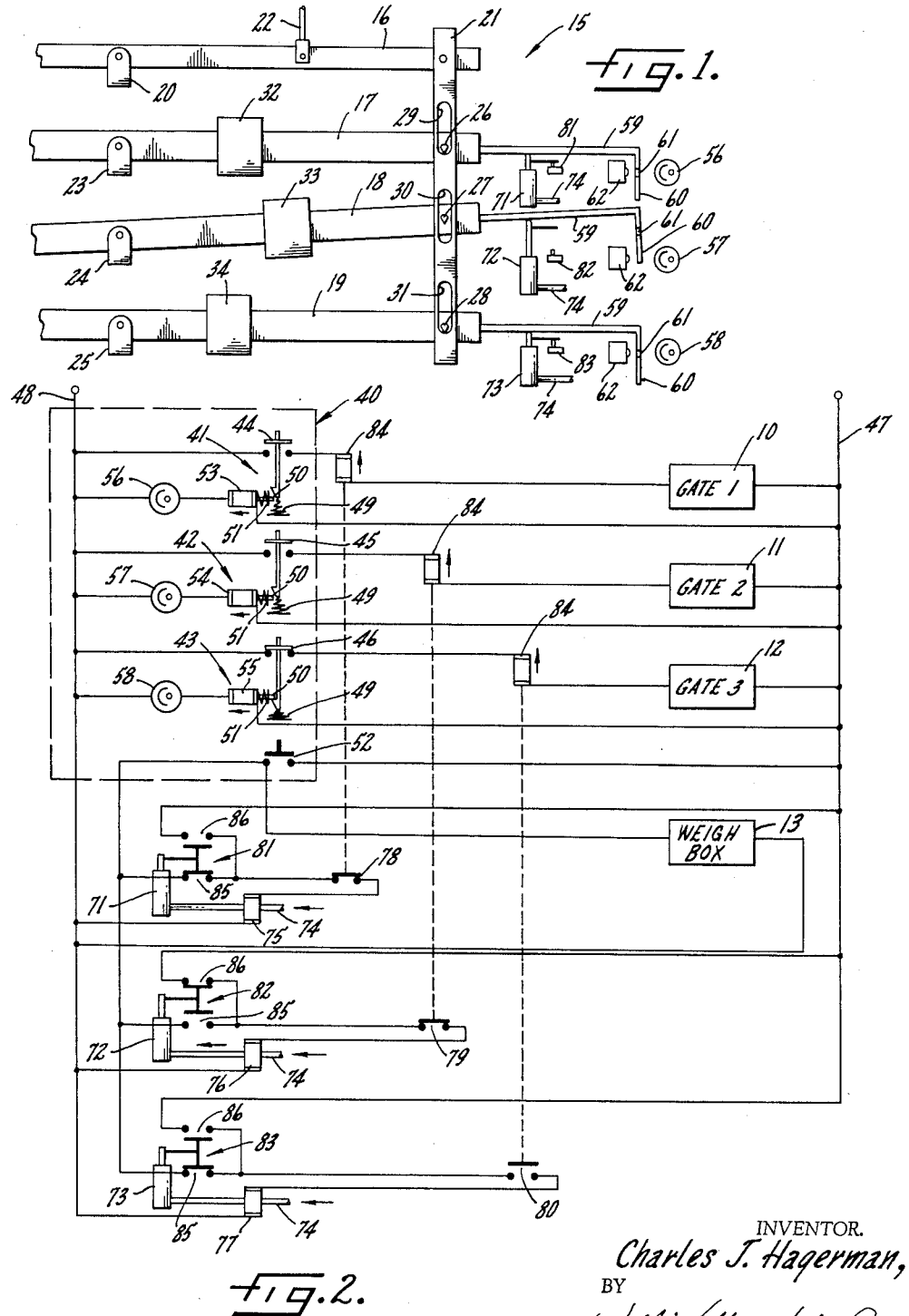

United States Patent Office 3,167,140
Patented Jan. 26, 1965

---

3,167,140
BEAM SCALE CONTROL SYSTEM
Charles J. Hagerman, Ludington, Mich., assignor to Jackson Vibrators, Inc., Ludington, Mich., a corporation of Illinois
Filed June 27, 1962, Ser. No. 205,782
3 Claims. (Cl. 177—70)

This invention relates to weighing devices and concerns, more particularly, a control system for a beam scale.

Scales having pluralities of independently set beams are commonly used to control mixing operations, as in concrete or asphalt batching plants. In such environments, the scale is coupled to the mixing container or weigh box and each scale beam is set to counterbalance the desired weight of a single ingredient. The beams are normally disabled and each beam is brought into play as the corresponding ingredient is added to the weigh box so that balancing of the scale after each beam is activated indicates that the desired amount has been added.

Mechanisms have been developed and have come into use for "automatically" operating batching plants by utilizing a timer controlled device to sequentially initiate the addition of each ingredient while a scale sensing device cuts off the flow of material as each weight level representing the addition of a selected amount is reached. These mechanisms are commonly restricted to mixing apparatus using dial type scales since the beam type of scale referred to above presents difficult problems for "automation." For example, each beam must be independently controlled and, further, provision must be made for the fact that the scale always returns to the same position when in balance, whether one or all of the individual beams are activated.

In view of the above, it is the primary aim of the present invention to provide a remote control system for beam scales which readily adapts apparatus using such scales for "automatic" or programmed operation.

It is also an object of the invention to provide a control system of the above character that easily and economically adapts existing equipment.

A further object is to provide a system as referred to above which is quite reliable, in that a weighing operation cannot be inadvertently repeated to double the desired amount of ingredient in a mix, and completely versatile, since all or any group of the scale beams can be utilized in any desired order without modification of the system.

Another object is to provide a system as characterized above that does not subject the scale with which it is associated to rough or jarring treatment.

Other objects and advantages of the invention will become apparent upon reading the following detailed description and upon reference to the drawing, in which:

FIGURE 1 is a partially diagrammatic elevation of the beam scale embodying the present invention; and FIG. 2 is a schematic diagram of the inventive control system associated with the scale of FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawing, there is shown a control system embodying the invention arranged to operate a batching or mixing apparatus in which three separate ingredients can be added from three hoppers to a mixing bin or weigh box that is selectively dumpable. Since batching mechanisms of this type are well known in the art, only the dispensers or gates 10, 11 and 12 for the respective hoppers are schematically shown, together with a weigh box dumping device 13. In the illustrated embodiment, directing an electric current to the gates 10, 11, 12 feeds material from the associated hopper into the weigh box. Current directed to the weigh box device 13 dumps the box so that it is emptied for the next mixing cycle. When used for mixing concrete aggregate, the gates 10 and 11 would normally control the addition of two different sizes of stone and the gate 12 would feed sand to the weigh box. The weigh box, in turn, would dump the mixed aggregate into a waiting truck.

To control proportioning of the materials, a scale 15 is provided with a tare beam 16 and a plurality of adjustable weight beams 17, 18 and 19 which can be selectively moved from disabled position into counterbalancing connection with the weigh box. The tare beam 16 is pivoted on a bracket 20, carries a coupling strap 21, and is connected to the weigh box through a link 22. The tare beam 16 and the strap 21 counterbalances the weigh box and its associated structure so that the tare beam 16 reaches its balance point when the weigh box is completely empty.

The beams 17–19 are pivoted on brackets 23, 24 and 25, respectively, and carry pins 26, 27 and 28 which fit freely through slots 29, 30 and 31 in the coupling strap 21. If the beams 17–19 are allowed to pivot freely about their respective brackets 23–25, the pins 26–28 strike the bottoms of the respective slots 29–31 so as to add the weight of the beams to the tare beam 16 in counterbalancing relation to the weigh-box of the mechanism. The beams 17–19 carry adjustable weights 32, 33 and 34 and can be considered associate with respective ones of the gates 10–12. The weights 32–34 are adjusted to balance the amount of material for each batch that it is desired to feed from each gate to the weigh box. In the present construction, the beam 17 is associated with the gate 10, the beam 18 with the gate 11 and the beam 19 with the gate 12.

In operation, the beams are initially held in disabled position with their respective pins 26–28 well clear of the bottoms of the slots 29–31. The beams are then released one by one so that their weight is added to the counterbalancing weight of the tare beam 16. After each beam is released, the associated gate is opened and material allowed to flow until the scale comes into balance. The next beam is then released and the operation repeated until all three of the beams 17–19 are coupled in counterbalancing relation to the weigh box and material has been fed through all three of the gates 10–12 to bring the scale to its balance point.

In carrying out the invention; a control unit 40 is provided embodying a plurality of controls 41, 42 and 43 with each control being coupled to a respective one of the gates 10–12 so that operation of a control causes the associated gate to open, the unit 40 also being effective to close each gate as the beam associated with the gate reaches a scale balancing point. In the illustrated construction, the controls 41–43 include pushbutton switches 44, 45 and 46, respectively, which are effective to electrically connect the gates 10–12 across electric power supply lines 47 and 48. The switches 44–46 are biased open by springs 49 and are releasably latched in their closed positions by a plurality of latches 50 which are urged toward their latching positions by springs 51.

In addition to the switches 44–46, the control unit 40 includes a fourth pushbutton switch 52 which, when closed, is effective to actuate the weigh box dumping device 13.

To open the gates 10–12 once the associated switches 44–46 have been closed and latched, the latches 50 are arranged to be released by respective solenoids 53, 54 and 55 which are connected across the lines 47, 48 in series with photoconductive cells 56, 57 and 58, respectively. The beams 17–19 carry, at their outer ends, bars 59 which support shields 60 formed with light transmitting slots 61. The cells 56–58, together with associated lamps 62, are arranged so that light passes through the slots 61 to render the cells conductive when the beams 17–19 are at the scale balancing point. It will thus be evident that the switches 44–46 remain latched only until their associated beams 17–19 reach their balancing points, at which time the cells 56–58 are rendered conductive so as to energize the respective solenoids 53–55 and thus unlatch and open the switches 44–46. In summary, the switches 44–46 may be manually closed to initiate feeding of material through the gates 10–12 and these gates are automatically closed when the beams 17–19 associated therewith are brought into balance.

Pursuant to the invention, a plurality of actuators 71, 72 and 73 are mounted adjacent respective ones of the beams 17–19 to hold the beams in disabled position when activated, with the actuators being held in active position when the associated one of the controls 41–43 is not operated and the actuator has been moved to its active position. Preferably, the actuators 71–73 are pneumatic motors whose movable elements lift the bars 59 when air is admitted to the motors through lines 74. In the drawing, the actuators 71 and 73 are shown in their inactive positions while the actuator 72 is in its active position urging the associated bar 59 upwardly so that the pin 27 on the beam 18 is well clear of the bottom of the slot 30.

The actuators 71–73 are controlled by solenoid valves 75, 76 and 77, respectively, which are connected across the lines 47, 48 through normally closed contacts 78, 79 and 80, respectively, and double throw switches 81, 82 and 83, respectively. The contacts 78–80 are operated by the respective controls 41–43 through solenoids 84 in the gate operating circuits. When the control 41 is operated by closing the switch 44, the associate solenoid 84 is picked up so as to open the normally closed contacts 78. Similarly, operation of the controls 42 and 43 causes energization of the respective solenoids 84 so as to open the associated contacts 79 and 80.

The switches 81–83 are operated by the respective actuators 71–73 and include contacts 85, which are closed when the associated actuators are in inactive position, and contacts 86, which are closed when the actuators are in active position. Since the actuator 72 is in active position, the associated contacts 86 are closed completing a circuit through the normally closed contacts 79 that is effective to energize the solenoid valve 76 and maintain a flow of air through the connected line 74 that is effective to hold the actuator 72 in its active position. Similarly, the actuators 71 and 73 are held in their active positions when their associated controls 41 and 43 are not operated and when the actuators are initially placed in their active positions so as to close the contacts 86 of their respective switches 81 and 83.

The actuators 71–73 are restored to their active positions upon dumping of the weigh box by energization of the device 13. To accomplish this, the pushbutton switch 52 is connected in series with the contacts 85 of the respective switches 81–83 so that closing of the switch 52 to energize the weigh box dumping device 13 completes a circuit through the closed contacts 85 of the switches 81–83 and the normally closed contacts 78–80 that is eeffctive to energize the respective solenoid valves 75–77. Thus, dumping of the weigh box restores the actuators 71–73 to their active positions where they are held through the then closed contacts 86 and the respective normally closed contacts 78–80.

It will be appreciated that the actuators 71–73 cannot be restored to their active positions unless the associated contacts 78–80 are closed, which means that the controls 41–43 are no longer in their operated condition. It is therefore impossible to shift the actuators 71–73 to their active positions, thus disabling the associated beams 17–19, unil the beams first reach their scale balancing point which indicates that the proper amount of material has been received in the weigh box. At this time, the cells 56–58 will be effective to release the switches 44–46 and restore the controls 41–43 to their nonoperated condition so that the contacts 78–80 resume their normally closed relationship. Therefore, once material dumping is initiated through one of the gates, the full amount as determined by the setting of the respective scale beam is added to the weigh box even though the weigh box dumping pushbutton 52 is closed prematurely.

Operation of the exemplary control system can now be readily appreciated. In the drawing, the parts are shown as they would appear if the full quantity of material had already been discharged through the gate 10, material was still being added through the gate 12, and the gate 11 had not yet been opened. The operating sequence can thus be readily seen.

At the start of the mixing cycle, all of the beams 17–19 are held in their disabled positions by the respective actuators 71–73, as the actuator 72 is illustrated holding the beam 18 in its disabled position with the pin 27 well clear of the bottom of the slot 30. The mixing cycle is started by closing one of the switches 44–46 so as to initiate operation of one of the respective controls 41–43; as in FIG. 2 the switch 46 is shown in closed and latched position so as to hold the gate 12 open. With the control 43 operated, the solenoid 84 associated with this control opens the normally closed contacts 80 so as to deenergize the solenoid valve 77 and allow the actuator 73 to assume its inactive position. This causes the pin 28 on the beam 19 to bottom in the slot 31 so that the weight of the beam 19 is added to the tare beam 16 in counterbalancing relationship with the weigh box. The gate 12 remains open until the increased weight of material in the weigh box brings the beam 19 to its scale balancing position, whereupon the cell 58 is rendered conductive causing the solenoid 55 to unlatch the switch 46. This closes the gate 12 and drops out the associated solenoid 84 so as to reclose the normally closed contacts 80. The parts then assume the position of the control 41 and the associated actuator 71; that is, the actuator remains in the inactive position so that the beam remains in counterbalancing relationship with the the weigh box but the associated control is no longer operated.

Upon completion of the mixing cycle when all of the controls and actuators have assumed the positions of the control 41 and the actuator 71, the pushbutton 52 is closed to dump the contents of the weigh box and restore all of the actuators 71–73 through the then closed contacts 85 and the respective closed contacts 75–80 to their active positions. The control system is then ready for the next mixing cycle.

When the unit 40 embodies manually operated switches 44–46, it will be obvious that a timer operated mechanism for sequentially closing the switches 44–46 could be embodied in the unit 40 to practice the invention.

Those familiar with this art will appreciate that the control system illustrated and described above can be easily added to virtually any mixing apparatus utilizing beam scales and remotely operated gates. It will also be appreciated that the controls 41–43 can be operated in any order or in any combination. The fact that the actuators 71–73 are not restored until the weigh box dumping device 13 is energized tends to prevent an inadvertent double operation of any one of the gates. In addition, through the use of pneumatic motors for the actuators 71–73, the flow of air through the lines 74 can be readily adjusted so that the beams 17–19 are not subject to rough or jarring handling.

I claim as my invention:

1. In an apparatus having a scale with a plurality of beams that can be selectively moved from disabled positions into counterbalancing connection with a weigh box and a plurality of controls for adding different materials to the box, the combination comprising, a plurality of pneumatic actuators each mounted adjacent a respective one of said beams, each actuator being effective to engage and support its respective beam in disabled position when activated, means including a solenoid valve and an electric circuit coupled to each actuator for holding that actuator in active position when the associated control is not operated and the actuator has been moved to active position, whereby operation of each control deactivates the associated actuator to add the beam held thereby into counterbalancing connection with the weigh box.

2. In an apparatus having a scale with a plurality of beams that can be selectively moved from disabled positions into counterbalancing connection with a selectively dumpable weigh box and a plurality of controls for adding different materials to the box, the combination comprising, a plurality of actuators each mounted adjacent a respective one of said beams, each actuator being effective to hold its respective beam in disabled position when activated, means coupled to each actuator for holding that actuator in active position when the associated control is not operated and the actuator has been moved to active position, whereby operation of each control deactivates the associated actuator to add the beam held thereby into counterbalancing connection with the weigh box, and means operable to activate said actuators upon dumping said weigh box.

3. In an apparatus having a selectively dumpable weigh box and a plurality of dispensers for adding different materials to the box, the combination comprising, a scale having a plurality of beams that are selectively movable from disabled positions into counterbalancing connection with the weigh box, a plurality of controls with each control coupled to a respective one of said dispensers so that operation of a control causes the associated dispenser to add material into said weigh box, means coupling each control to a respective one of said beams so that each dispenser stops adding material to the box when the beam associated with its control reaches a scale balancing point, a plurality of actuators each mounted adjacent a respective one of said beams, each actuator being effective to hold its respective beam in disabled position when activated, means coupled to each actuator for holding that actuator in active position when the associated control is not operated and the actuator has been moved to active position, whereby operation of each control deactivates the associated actuator to add the beam held thereby into counterbalancing connection with the weigh box, and means operable to activate said actuators upon dumping said weigh box.

References Cited in the file of this patent

UNITED STATES PATENTS

| | | |
|---|---|---|
| 2,067,744 | Williams | Jan. 12, 1937 |
| 2,467,300 | Fate | Apr. 12, 1949 |
| 2,549,704 | Noble | Apr. 17, 1951 |
| 3,092,193 | Bowman | June 4, 1963 |